(12) United States Patent
McNairy et al.

(10) Patent No.: US 9,483,293 B2
(45) Date of Patent: Nov. 1, 2016

(54) TECHNOLOGY ABSTRACTION LAYER

(75) Inventors: Cameron McNairy, Windsor, CO (US); Don Soltis, Windsor, CO (US)

(73) Assignee: Intel Corporation, Santa Clara, CA (US)

( * ) Notice: Subject to any disclaimer, the term of this patent is extended or adjusted under 35 U.S.C. 154(b) by 138 days.

(21) Appl. No.: 13/997,734

(22) PCT Filed: Dec. 30, 2011

(86) PCT No.: PCT/US2011/068215
§ 371 (c)(1),
(2), (4) Date: Jul. 10, 2014

(87) PCT Pub. No.: WO2013/101217
PCT Pub. Date: Jul. 4, 2013

(65) Prior Publication Data
US 2014/0359640 A1    Dec. 4, 2014

(51) Int. Cl.
*G06F 9/455* (2006.01)
*G06F 9/54* (2006.01)
*G06F 12/08* (2016.01)
*G06F 9/44* (2006.01)

(52) U.S. Cl.
CPC .......... *G06F 9/45541* (2013.01); *G06F 9/441* (2013.01); *G06F 9/542* (2013.01); *G06F 12/0893* (2013.01)

(58) Field of Classification Search
CPC .......... G06F 12/1491; G06F 9/45541; G06F 9/45545
See application file for complete search history.

(56) References Cited

U.S. PATENT DOCUMENTS

| | | | |
|---|---|---|---|
| 7,904,751 B2 | 3/2011 | Marisetty et al. | |
| 2003/0051190 A1* | 3/2003 | Marisetty ............ | G06F 11/2242 714/11 |
| 2003/0074601 A1* | 4/2003 | Schultz ............... | G06F 11/0772 714/15 |
| 2003/0204710 A1 | 10/2003 | Culter et al. | |
| 2004/0095833 A1 | 5/2004 | Marisetty et al. | |
| 2008/0077909 A1 | 3/2008 | Collins et al. | |
| 2011/0153926 A1* | 6/2011 | Fang ................... | G06F 12/0895 711/105 |

OTHER PUBLICATIONS

Popovici, K; Jerraya, A., "Hardware Abstraction Layer-Introduction and Overview," Hardware-Dependent Software: Principles and Practice, W. Ecker, W. Müller, and R. Dömer eds., Springer, 2009, pp. 67-94 [retrieved from http://link.springer.com/chapter/10.1007/978-1-4020-9436-1_4].*

(Continued)

*Primary Examiner* — Brian W Wathen
(74) *Attorney, Agent, or Firm* — Trop, Pruner & Hu, P.C.

(57) ABSTRACT

Embodiments of a system and method for triggering an event in a hardware abstraction layer (HAL) are generally described herein. In some embodiments, the HAL can include unarchitected hardware or software that can be used to, for example, facilitate instruction emulation and debug; enable protection of model specific resources, instructions, and behaviors; redirect, resteer, or substitute instructions; and provide a framework for additional capabilities and features.

18 Claims, 6 Drawing Sheets

(56) References Cited

OTHER PUBLICATIONS

Yoo, S; Jerraya, A., "Introduction to Hardware Abstraction Layers for SoC", Embedded Software for SOC, 2003, pp. 179-186 [retrieved from http://link.springer.com/chapter/10.1007/0-306-48709-8_14].*

Intel, "Intel Itanium Processor Family Error Handling Guide" (Feb. 2010), pp. 1-46 [retrieved from http://www.intel.com/content/dam/www/public/us/en/documents/guides/itanium-error-handling-guide.pdf?_ga=1.78847188.1739970881.1452386341].*

International Searching Authority, "The International Search Report," mailed Mar. 2, 2012, in International application No. PCT/US2011/068215.

International Searching Authority, "The Written Opinion of the International Searching Authority," mailed Sep. 28, 2012, in International application No. PCT/US2011/068215.

Taiwan Patent Office, Office Action Mailed Jul. 25, 2014, in Taiwan Application No. 101151082.

* cited by examiner

TECHNOLOGY ABSTRACTION LAYER

TECHNICAL FIELD

Embodiments pertain to hardware abstraction layers (HALs) that can abstract privileged processor resources.

BACKGROUND

Current abstraction layers, such as the processor abstraction layer (PAL) and the system abstraction layer (SAL), are architected such that interfaces to the abstraction layers do not change when the underlying hardware changes, thereby reducing the possibility that applications or operating systems (OSs) will not work when changes are made to the hardware. It follows, then, that an application that uses the abstraction layers can be used among systems having different hardware types and/or versions, as hardware-specific implementations are abstracted from the application and OS layers.

PAL and SAL are examples of architected HALs, in that all operations performed by PAL and SAL are publicly known or useable and are implemented in software. For example, architected features can be published in technical documentation such as hardware datasheets, software developer's reference manuals, processor design guides, platform design guides, etc.

Because these HALs are architected such that they are visible to all software, it can be difficult to provide access to protected resources or increase the functionality of PAL or SAL to support debug and bug fixes during validation or after production of a processor.

DETAILED DESCRIPTION

The following description and the drawings sufficiently illustrate specific embodiments to enable those skilled in the art to practice the embodiments. Other embodiments can incorporate structural, logical, or electrical, process, and other changes. Portions and features of some embodiments can be included in, or substituted for, those of other embodiments. Embodiments set forth in the claims encompass all available equivalents of those claims.

Figure 1:
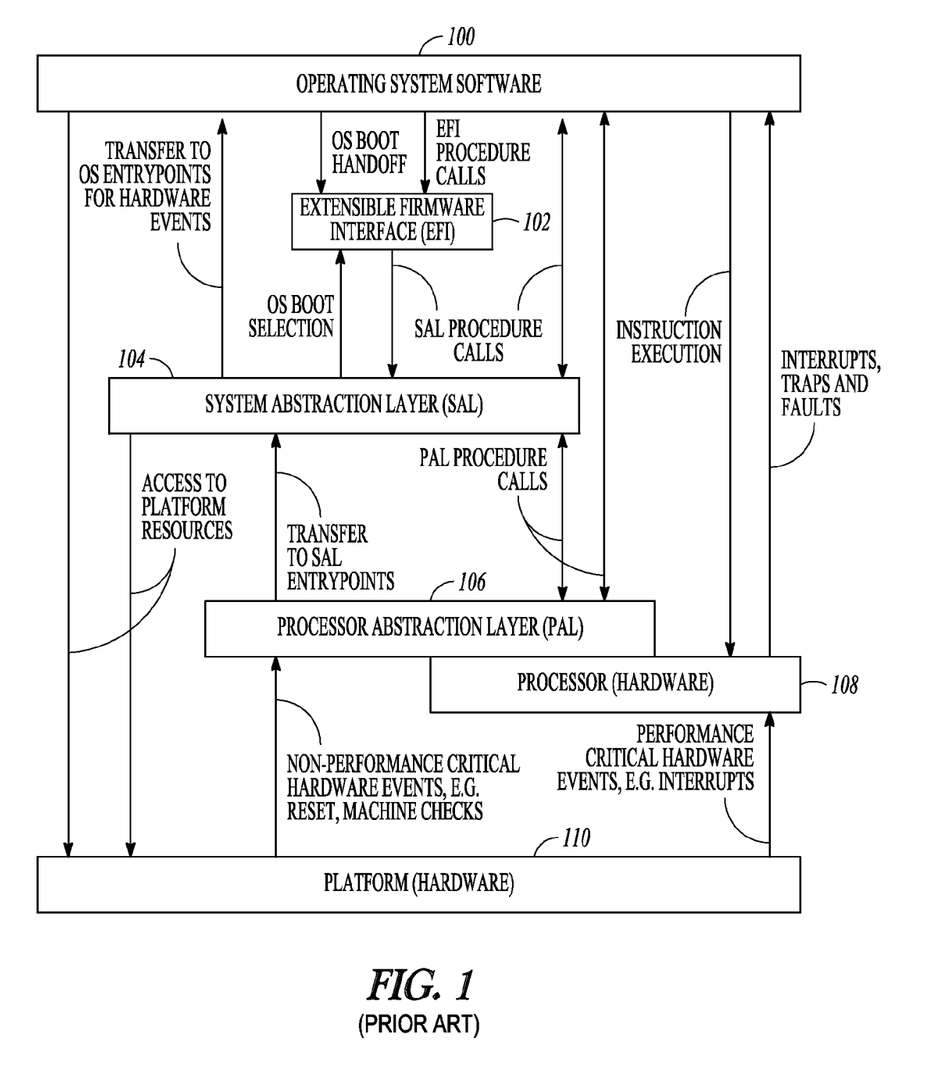
FIG. 1 is a schematic block diagram illustrating a firmware architecture for an Intel Itanium-64 processor.

FIG. 1 illustrates shows various software, firmware, and hardware (e.g., processor) layers and interfaces for Intel Itanium processors. An operating system software layer 100 sits at the top of the architecture. Various firmware components reside in the next three lower layers, including an extensible firmware interface (EFI) layer 102, a system abstraction layer (SAL) 104 and a processor abstraction layer (PAL) 106. The PAL is closely connected to processor operations, and thus sits atop a processor layer 108. The bottom layer in the architecture is the platform hardware 110.

The layered architecture of FIG. 1 forms an abstracted set of interfaces that can enable a common operating system (binary) to operate on Intel Itanium-based platforms having a variety of different configurations. An interface can be any event that causes entry to the HAL. At the same time, firmware-layer components are abstracted from the operating system, enabling those firmware components to support multiple operating systems, including but not limited to Microsoft® Windows® operating systems and various flavors of Linux and UNIX operating systems.

PAL 106, SAL 104, and EFI 102 together can provide system initialization and boot, Machine Check Abort (MCA) handling, Platform Management Interrupt (PMI) handling, and other processor and system functions that can vary between implementations. The interaction of the various functional firmware blocks is shown in FIG. 1. PAL 106 encapsulates processor implementation-specific features, while SAL 104 is a platform-specific firmware component that isolates operating systems and other higher-level software from implementation differences in the platform. EFI provides a legacy-free API interface to the operating system loader. EFI can also be configured to support legacy components.

EFI is a public industry specification that describes an abstract programmatic interface between platform firmware and OSs or other custom application environments. The EFI framework includes provisions for extending the basic input/output system (BIOS) functionality beyond that provided by the BIOS code stored in a platform's BIOS device (e.g., flash memory or ROM). More particularly, EFI enables firmware, in the form of firmware modules and drivers, to be loaded from a variety of different resources, including primary and secondary flash devices, option ROMs, various persistent storage devices (e.g., hard disks, CD ROMs, etc.), and even over computer networks.

Embodiments of the disclosed technology abstraction layer (TAL) include capabilities that would otherwise be unavailable to the processor. These capabilities can be used to solve problems that are otherwise difficult to solve. These capabilities can also increase flexibility of the processor design by including, for example, capabilities that are not currently available in other abstraction layers. These capabilities can be used by, for example, other HALs, or OS and application layers. The TAL disclosed herein can be described as a capability layer because it can incorporate elements of both hardware and software not currently existing that can, for example, provide new low-level visibility into processor operations. The term TAL is used to signify differences from prior art HALs, such as providing visibility to processor components that are not visible to prior art HALs.

In contrast to prior art HALs, a TAL can abstract, or provide an abstracted interface to, privileged processor resources. These privileged processor resources can be unarchitected such that the processor resources are either not disclosed in any technical documentation provided to purchasers of the hardware, or disclosed only as an unsupported feature. PAL and SAL do not contain any privileged functions that any process cannot access. In contrast, an unarchitected function can be proprietary and secret. For example, particular opcodes for a processor might not be publically acknowledged, and might even be protected from use by third-party software.

Figure 2:
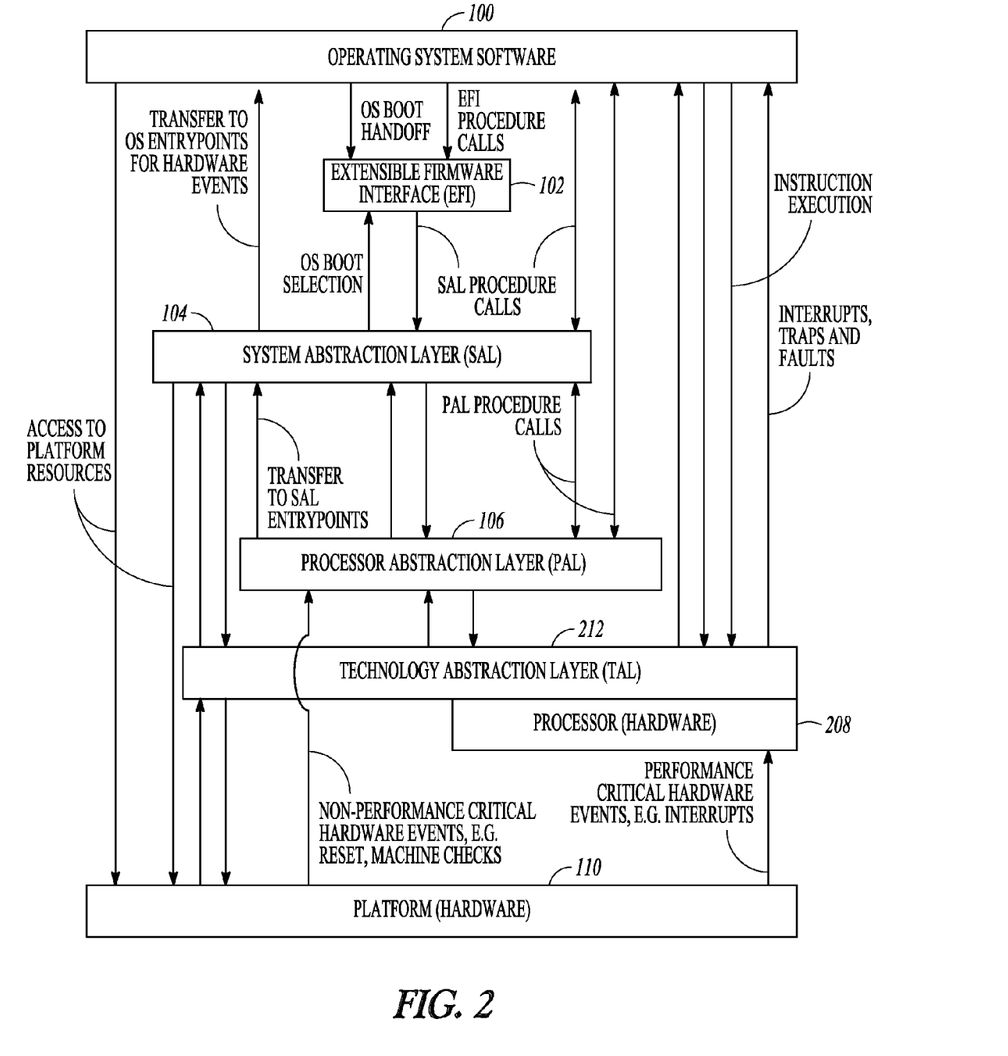
FIG. 2 is a schematic block diagram illustrating a second firmware architecture for an Intel Itanium-64 processor.

To better understand how TAL can be employed in the following embodiments, attention is drawn to FIG. 2, which illustrates an embodiment including a third abstraction layer, identified as Technology Abstraction Layer (TAL) 212. TAL 212 can be optionally coupled to each of processor (hardware) 108, platform (hardware) 110, OS layer 100, PAL 106, SAL 104, and EFI 102. TAL 212 can also be conceptually between PAL 106 and processor (hardware) 108. In an unarchitected embodiment, TAL 212 will not have a direct interface to OS layer 100; however, instructions from OS layer 100 can generate additional instructions to TAL 212 from PAL 106, SAL 104, or EFI 102. Other interfaces to applications or virtual machines running above OS layer 100 are possible, however are not illustrated for simplicity.

Events or interfaces that can trigger TAL 212 can be synchronous or asynchronous. Exemplary synchronous events include instruction match, fault, trap, or a myriad of pipeline events, such as issue port, instruction type, resource conflicts, resource constraints, bandwidth constraints, etc. Asynchronous events include timeout, counter overflow, external interrupts, non-pipeline events, reset events, error events, etc. Events can be triggered by both hardware (e.g., execution of a functional unit, such as a floating-point unit) and software (e.g., firmware instruction). TAL 212 can be triggered by events that are different from, or the same as, events that trigger current SAL and PAL layers. Additional exemplary events that can cause entry to TAL 212 include the following:

RESET
ERROR
INTERRUPT
OPMATCH—entry when a particular opcode is matched
IVA TRANSFER—Interrupt Vector Address transfer
PERFORMANCE—e.g., cache misses greater than a predefined value
operation targeting a particular address or register
fault/trap such as an instruction failure Note that a single instruction can trigger one or more of the events identified above. Moreover, the events or event classes above, for example PERFORMANCE, can be triggered by many different events, each causing a PERFORMANCE event operation to be performed.

Figure 3:
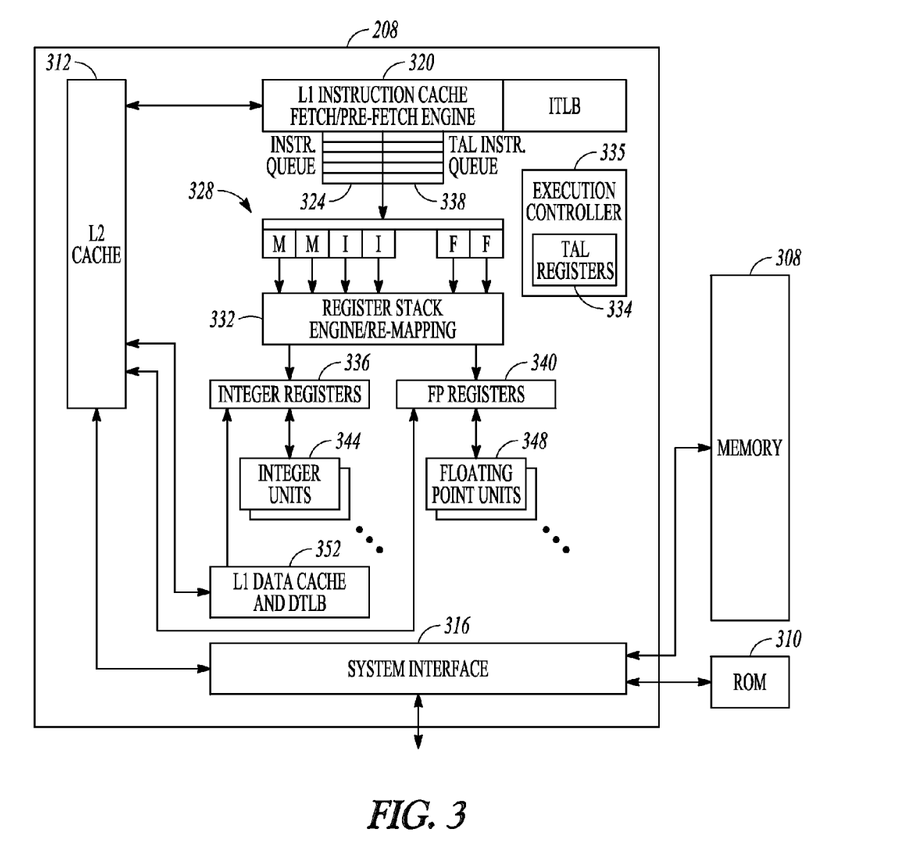
FIG. 3 is a schematic block diagram illustrating a processor in accordance with some embodiments.

An exemplary processor capable of supporting TAL 212 is illustrated in block diagram form in FIG. 3. The processor 208 has a built in level 2 cache 312 and a system interface 316, which can receive instructions and data from an external bus (not shown). Alternatively, program instructions and data can be stored in a memory 308 or read-only memory (ROM) 310, which is also coupled to the system interface 316. ROM 310 can also be an electronically-erasable programmable ROM (EEPROM). Processor 208 can include a combined level one instruction cache, fetch/pre-fetch engine and instruction translation lookaside buffer (ITLB) 320. Caches 312 and 320 can include state information, such as modified, exclusive, shared or invalid (MESI); an additional TAL (T) state, discussed in more detail below, can identify or protect TAL 212 entries. An instruction queue 324 feeds a number of issue ports 328 that have been arranged to receive branch instructions, memory access instructions (M), integer operation instructions (I), and floating point instructions (F) as indicated. The issue ports 328 feed a register stack engine/re-mapping unit 332, which configures onboard registers 336 and 340 for parallel processing. These registers 336, 340 feed their respective branch and memory units (not shown), integer units 344, data cache and data translation look aside buffer unit 352, and floating point units 348 that can operate in parallel. Execution controller 335 can be used to detect TAL 212 events and initiate TAL 212 operations. Execution controller 335 can include storage registers, such as TAL registers 334, that can include copies of information from, for example, registers 336 and 340, register stack engine/re-mapping unit 332 or instruction queue 324 and other TAL-specific information. Execution layer 335 can be coupled to, for example, onboard register 336 and 340, register stack engine/re-mapping unit 332, or any other microarchitecturally significant feature. Other TAL-specific resources, not illustrated, can be included, such as cache entries, TLBs, queues, pipelines, or any other microarchitecturally significant feature. TAL instruction queue 338 can temporarily store instructions before they are inserted into the processor pipeline. TAL instruction queue 338 can be the same or different size relative to instruction queue 324; alternative embodiments can omit TAL instruction queue 338. Processor 208 can be, for example, an explicitly parallel instruction computing (EPIC) type that allows a programmer to ensure the parallel execution of certain designated tasks, by selecting instructions, such as load and add, that, by definition, force processor 208 to execute memory fetch and arithmetic operations in parallel.

Examples of TAL configuration registers, which can be included in execution controller 335 and TAL registers 334, are provided below:

Switch Disable (sd): when sd=1 all thread switching is suppressed, only explicit instruction hints will cause a thread switch.

Bank of TAL registers (bt): The TAL Bank of general registers are available when bt=1. A shadow copy of this can be maintained.

TAL privileges (tl): When the bit is set, TAL 212 can access protected resources. A TALAccessViolation (TAV) event will be generated if a TAL 212 instruction is retired when tl=0.

PTC Shootdown HOLD (ph): Incoming operations can be held off while ph=1.

TAL Resteer Enable (tr): An asynchronous pending TAL event will resteer if tr=1. Unmaskable TAL 212 events (e.g., RESET.* and Probe Mode) can resteer regardless of this bit. A .tr=0 will suppress all synchronous OPMATCH events (pa): This bit can enable all IVA TRANSFER events regardless other configuration settings such that, when set, all exceptions will cause a transition into TAL.

First After (fa): TAL 212 IVA TRANSFER and OPMATCH events are suppressed from pending when fa=1. This bit can be cleared on any instruction retired after fa is set.

Diagnose (dg): When dg=1, all thread switching away from this thread are suppressed.

Low Power (lp): When lp=1 all thread switching to this thread is disabled.

Probe Mode (pm): When pm=1, all data prefetch, and front-end demand and prefetch requests are suppressed.

These registers can be programmed by BIOS or TAL to ensure proper and efficient system operation.

Examples of TAL registers 334 are provided below:

TAL Current State: Can include a tread ID to store the ID of the thread executing when TAL 212 is entered; count can count the number of pending TAL 212 events; event ID can identify an event class that triggered TAL 212, and vector ID can more particularly identify the event of the event class that triggered entry to TAL 212.

(Copies of the register can be made for additional pending events or most-recently exited events)

TAL Pending: Can provide a count of the number of event pending of each event class. For example, the number of OPMATCH or the number of ERROR events that are currently pending. (As with TAL Current State, the state of TAL Pending can be copied to additional registers for processing multiple pending TAL 212 events.)

TAL IVA: Can store the addresses of the IVA handler that would have been used for an IVA TRANSFER event had TAL 212 not been triggered.

When one or more of the earlier-identified events is detected, processor 208 can begin executing a TAL 212 enter procedure to accomplish tasks on behalf of the event that triggered TAL 212, and can enter a security-evaluation structure to ensure that only authorized tasks are performed on behalf of the caller. An event causing TAL 212 to be entered can first cause the current processor state, at the time that the event is detected, to be preserved. (Note that, in regard to the processor 208, the terms "context" and "state" are interchangeable, and either term can be used herein.) State can be understood as either the architectural or microarchitectural state. An example of the architectural state is the current values stored in processor registers such as the Instruction Pointer (IP), PSR, Interrupt Instruction Bundle (IIB), and control registers. In addition TAL 212 can preserve a thread ID, event ID, and vector ID (e.g., event within an event class) responsible for the current TAL 212 event. An example of the microarchitectural state is the current state of one or more processor pipelines, which can be preserved, flushed, and restored at a later date. Another example can be a count field used to determine whether any new TAL 212 events occurred while servicing the current TAL 212 event. The event ID can identify the type of event that triggered TAL 212. The event ID can be used to identify unserviced events to remove from a queue of pending TAL events. Additional information that TAL 212 can store includes information indicating privilege, mode, IP ranges that are enabled, and other aspects of configuration. TAL 212 can access these and other protected registers. Each of these registers are for illustration purposes only, and more or fewer registers could be used.

Preserved state information need not be explicit as to the cause of TAL 212 entry. For example, the preserved information can be associated with a class or group of events. A class of events, such as a group of interrupts, can trigger identical TAL 212 events, thereby reducing the number of unique TAL 212 configurations. The events can be identical, or at least begin in the same manner, but can ultimately perform different operations when more state information is considered. For example, two interrupts can cause the same INTERRUPT event operation to begin, but system state can cause the ultimate operation to be different. TAL 212 can sometimes extrapolate the exact event that caused TAL 212 entry. For example, if a floating-point operation is preserved as the trigger of the event, and the event is associated with functional units, TAL 212 can infer that the floating-point unit caused entry to TAL 212. In other examples, the exact cause of TAL 212 entry might not be able to be inferred, but enough information to perform the TAL 212 operation exists without knowing the exact reason for entry. Accordingly, the current processor state is preserved such that TAL 212 operations can be performed to determine, with sufficient granularity, which event caused entry to TAL 212. Preserving current processor state can be useful to resolve what caused entry to TAL 212, or to return to the preserved processor 208 state after the TAL 212 operation is exited.

Figure 4:
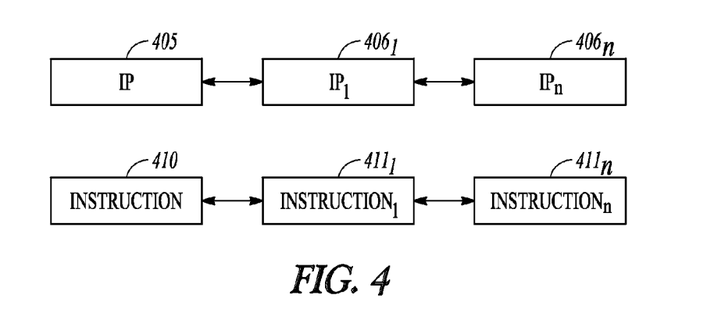
FIG. 4 illustrates nested registers in accordance with some embodiments.

FIG. 4 illustrates preservation of processor state using nesting. Processor state can be pushed onto a series of registers to preserve one or more nested states. For example, an IP register 405 can have one or more corresponding registers $406_1 \ldots 406_n$ for preserving state information. In addition, a register can store the instruction 410 that triggered TAL entry in registers $411_1 \ldots 411_n$. Registers $406_1 \ldots 406_n$ and $411_1 \ldots 411_n$ can be pushed and popped as needed. In doing so, information of the processor state when TAL was entered, or while in TAL 212, is preserved for efficient entry and exit. These registers are features that can be architected or unarchitected, but TAL 212 can have direct access to each in case they need to be read or modified.

As an example, a RESET class of TAL 212 events, including FULL, STATE, and LOGIC events, can cause processor 208 to perform an operation using a specific register configuration. The configuration can cause the processor to program registers such as the sd, bt, tl, ph, tr, pa, fa, dg, lp and pm configuration registers defined above. Additional registers that can be programmed when TAL 212 is triggered include IP, PSR, IIB and other control registers. In addition, or in the alternative, the configuration registers can identify one or more FSMs, or initial states for the one or more FSM. to perform the TAL 212 operation. By configuring these registers, the processor can branch to a location in the TAL 212 image that contains instructions for performing a corresponding TAL 212 operation having a corresponding privilege. While the events in an ERROR class, such as CHECK and INFORM events, can cause processor 208 to perform a different procedure with a potentially different register configuration. (Note that event classes are optional, and each event can have a different associated operation or register configuration.) When TAL 212 does get control, a preserved instruction 406, or other state information, can be used to identify why TAL 212 was entered, which can be used by TAL 212 for decoding, branching, or configuring the IP and other registers to perform specific operations.

After preserving processor state, a new execution state can be established for a TAL 212 operation associated with the triggering event. The execution state can program registers to perform a hardware abstraction flow or TAL 212 operation; a hardware abstraction flow or operation can comprise one or more instructions corresponding to the detected or triggering event. Alternatively, a hardware-implemented finite-state machine (FSM), hardwired or programmable, can be entered instead of, or in combination with, the TAL 212 operation. Next, a hardware abstraction flow (e.g., FSM or TAL 212 operation), which can be predefined or constructed on-the-fly, can be initiated using, at least in part, a series of operations or an FSM of TAL 212. Execution can consist of doing nothing when, for example, a previous entry to TAL 212 obviates the need to perform the operation again.

TAL 212 can also be used to redirect, resteer, perform binary translation, or substitute operations of processor 208. For example, an instruction can be redirected from a faulty register, e.g., transistor wear-out, to a different operational register. As another example, an operation, or sequence of operations, can be detected that can cause a resteer of processor 208, e.g., a new set of instructions can be executed instead. The new operation performed as a result of the resteer can be sourced from unarchitected, TAL-specific resources, TAL registers 334, caches 312 or 320, ROM 310 or memory 308, and can be chosen based on the event that triggered entry to TAL 212. TAL 212 can perform binary translation, e.g., an instruction or group of instructions can be transformed from one instruction set architecture (ISA) to another. In addition, TAL-specific instructions can trigger an event and be translated into processor-understandable instructions. This is also known as binary translation. Hints can be included in instructions that trigger TAL 212 to help handle the particular event. Finally, new instructions can be substituted for instructions that caused entry to TAL 212. For example, an integer operation can be changed to a floating-point operation. These features can be used to produce abstracted operations in non-CISC architectures.

Figure 5:
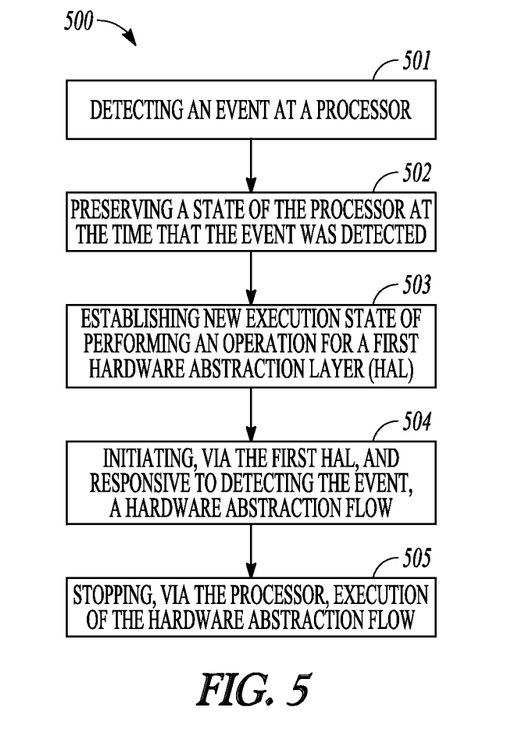
FIG. 5 illustrates a flow chart depicting functions in accordance with some embodiments.

When hardware abstraction flow completes or stops, the state at which processor 208 existed at the time the TAL 212 event was triggered can be restored, or it can be restored in a modified or completely different state. TAL 212 can be exited, and control can return to the OS layer 100, application layer(s), virtual machine, another HAL, or any other process. If the original instruction that triggered entry to TAL 212 is to be executed, re-entry into TAL 212 can be suppressed for the first instruction, after restoring the original thread, to avoid an infinite loop of entering and re-entering TAL 212. This function The functions described above are illustratively summarized in flowchart 400 of FIG. 5. Box 501 illustrates detecting a synchronous or asynchronous event in processor 208. Box 502 illustrates preserving the current state of processor 208 such that it can be recalled, if necessary, in the future. Box 503 illustrates establishing a new execution state for performing a TAL 212 operation. Establishing a new execution state can comprise loading processor registers, such as those discussed above, with information from regions of caches 312 or 320 in the TAL (T) state, from ROM 310, or TAL registers 334. Box 504 illustrates initiating a hardware abstraction flow, e.g., one or more instructions or an FSM corresponding to the detected or triggering event, or a combination of the two. When the hardware abstraction flow completes, execution can stop (box 505) and return to the preserved state, a modified version of the preserved state, or a completely new state.

TAL 212 can have dedicated resources, such as register, data and code resources for executing operations that are not currently possible. By using these dedicated resources, TAL 212 can synthesize instruction sequences to be executed without requiring memory or cache for instruction storage. Each event category can have one or more unique configuration registers that state aspects of an operation to perform (e.g., offset from TAL image to branch to, status of enables, etc.) of all events associated with that category. All TAL 212 events can also share other resources such as an instruction buffer for performing operations.

TAL 212 can include reliability features such as the ability to continue execution despite corrupted execution layer code in memory 308 or caches 312 or 320. Since TAL 212 can exist in an un-reliable location (e.g., caches 312 or 320), it can be advantageous for TAL 212 to be resilient to temporary and hard errors associated with resources such as caches 312 or 320. To do this, any cacheable access that encounters an error can transition to a version of the TAL 212 image in a trusted and more error-resilient resource, such as ROM 310. If an error occurs, the instruction can be refetched from ROM 310 instead of from caches 312 or 320 using, at least in part, an attribute change and a full pipeline flush. If nesting is enabled or this is not a TAL 212 fetch, then TAL 212 can signal a normal error associated with the TAL 212 operation and enter TAL 212 as expected using a version of the TAL 212 image from a more resilient resource. If this error occurred when already accessing ROM 310, then recovery might be more difficult. For example, a fatal error can be logged and system operations can attempt to continue or reset can occur.

In another example, an error detected during a first TAL 212 operation can cause a second TAL 212 event. The TAL 212 operation that causes and error and entry to TAL can cause a push of configuration registers, e.g., nesting, and a second TAL operation can be performed before popping the first TAL 212 operation.

TAL 212 resources (e.g., registers 334, caches 312 or 320, and data) can be pinned into resources such as caches 312 or 320, other registers, or memory, such that they are managed by TAL 212 and protected from external observation. In other words, cache and data used by TAL 212 can be invisible to and protected from other layers such as OS layer 100 or application layers because TAL 212 is unarchitected. In one embodiment, caches 312 or 320 can protect TAL 212 code by having a TAL (T) state such that a line cannot be evicted. The TAL state can allow for cacheable code fetches to hit, but prevent external snoops, and data accesses from hitting or allocating on a miss. Suppression of external accesses to a TAL state line can ensure that others cannot see or modify the code, thereby maintaining security. The cache can also support writing data, tags, and state to specific values. TAL 212 can hide cacheable code fetches by locking cache to accesses during a TAL 212 operation or cache access. TAL 212 can identify instances when such an operation might be advantageous, and can transparently perform the operation.

Alternatively, TAL-specific memory ranges in system memory space can be protected from non-TAL operations. For example, an extra bit can be provided to addressable memory space, and only TAL operations can address memory at locations having the extra bit set.

In addition to resources dedicated to TAL 212 alone, some resources can be available to other HALs or processes depending on privilege levels. Privilege levels can have varying levels of protection, giving different levels of access to the resource environment. In other words, some processor 208 features will not be accessible if a process or thread does not have enough privilege. For example, an application running in the OS layer 100 can access processor 208 and have a corresponding privilege of 5, while TAL can access processor 208 with a corresponding privilege of 2—a lower privilege gives TAL 212 more access to processor 208 and instructions. Privilege can be assigned per event type. For example, RESET can have a privilege of 0 and ERROR can have a privilege of 4.

In addition to being able to run processes with a lower privilege value, e.g., having greater access to system resources, TAL 212 can use the "native" privilege and resource environment (i.e., use the privilege and resource environment of the process that triggered TAL 212). TAL 212 can execute instructions using different privileges during a sequence of instructions performed due to a single event. Hence, performing operations using a less privileged state can lead to efficient use of resources.

Additional examples of how TAL 212 can be used include providing flexible run time services, supporting efficient opcode emulation, support opcode/bug workarounds, providing reliable resources during Machine Check Architecture (MCA) processing, providing protection/security against tampering for TAL code image and data store, and authenticate code source.

As another example, an event generated by a guest operating system in a virtualized environment can be handled by TAL 212 instead of the Virtual Machine Manager (VMM). This can be useful to, for example, fix bugs, perform data collection, or handle interrupts because TAL 212 can have more privileges than the VMM. For example, the VMM need not be notified that an error occurred, thereby reducing dependency on the VMM for error handling, and allowing consistent error handling in the system. In this manner, a computer can efficiently support more guests due to more efficient resource utilization.

In another example, TAL 212 can provide secure storage and management of cryptographic keys. For example, an application can store keys in protected TAL 212 resources that are hidden from the OS layer 100 and application layers.

TAL 212 can execute atomic or non-atomic operations. An atomic operation can have execution or cache atomicity, or any combination of the two. An atomic operation can comprise one or more instructions performed consecutively without interruption and with exclusive access to resources. The decision of whether to use an atomic transaction can be based on latency and availability considerations. An example of when TAL 212 should perform a non-atomic operation can be used includes flushing the caches 312 and 320, which might take too long from the user's perspective. Therefore, it can be advantageous to flush the cache in segments and allow other operations to occur in between flushes.

Yet another example of how TAL 212 can be used is that a detected but uncorrected error (DUE)—a fatal error—can be changed into a detected and corrected error (DCE)—a non-fatal error. This can be advantageous, for example, during debug or normal runtime environments to continue operation after a fatal error occurs. Typically, fatal error can cause reset, which can prevent further operation. If the fatal error is changed to be non-fatal, then operation can continue and useful debug information can be collected. Other examples include the ability to modify system behaviors in the case of a manufacturing, design, or transient defect. This feature can provide survivability during failures or dynamic re-configuration.

Because TAL 212 can be protected from a non-trusted OS layer 100 or applications, it can subsume some of the responsibilities currently in other areas, such as processor-authentication, protection mode transitions, early determinism/initialization, and error handling. Therefore, in addition to adding new capabilities to the system, TAL 212 can be used to perform current processes more efficiently or with greater flexibility for the hardware designer.

TAL 212 may have two basic images: a boot image and a run-time image. (what is important is stability) A ROM can hold both images. The run-time image can be copied by TAL 212 into cache or TAL 212-specific resources as part of the reset initialization flow. This spilt can allow the run-time image to be small, and execute quickly with little overhead. The first TAL 212 instructions can come from ROM 310 or caches 312 or 320, but the TAL 212 can include information from other firmware locations as long as that code image is authenticated before being used for instruction fetch. If a code image other than ROM 310 is used, it can be advantageous to provide a register (e.g., TAL_START_ALT) to identify the location of an operation for handling code fetch errors and reset events.

Exemplary embodiments of TAL 212 operations fit into one of three security levels: high, medium, and low. Some functions can use varying security levels during a single TAL 212 operation because the verification associated with the medium level might be too great, e.g., take to long. TAL 212 can consciously trade performance for security in these cases. Exemplary descriptions of three possible security levels are below:

High security operations can have their caller and parameters authenticated using the authentication operations already at hand. This ensures that these functions and data activities are completely authentic.

Medium security operations can verify their caller address and requested function against a list of known callers. The input parameters might not be verified. The inclusion of the function verification prevents hijacking of the verified caller with different arguments.

Low security operations can have no verification of their caller or requested function.

Figure 6:
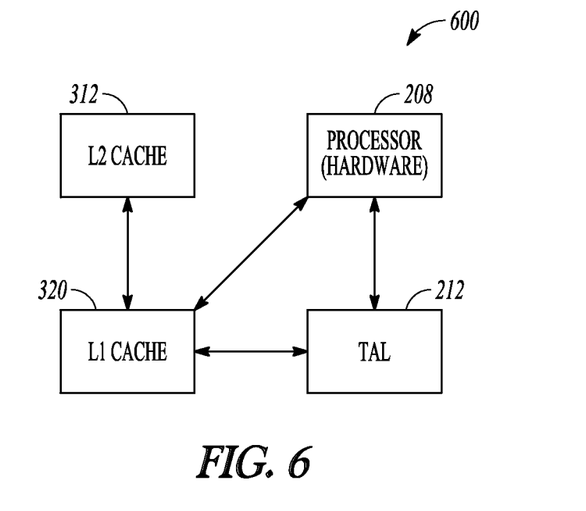
FIG. 6 illustrates a simple system diagram in accordance with some embodiments.

FIG. 6 illustrates an exemplary system 600 capable of performing functions described above. The components of system 600 were discussed in greater detail above, but are collectively summarized here again. FIG. 6 illustrates processor (hardware) 208 and TAL 212 coupled to L1 cache 320, which is coupled to L2 cache 312. Each of the components of system 600 can independently communicate with other system components. Furthermore, as described above, events that can cause entry to TAL 212 can have varying privileges. TAL 212 can execute one or more procedures corresponding to the event that caused entry. The TAL 212 procedures can use the native privilege of the triggering event, or can use different privileges having varying levels of protection.

Figure 7:
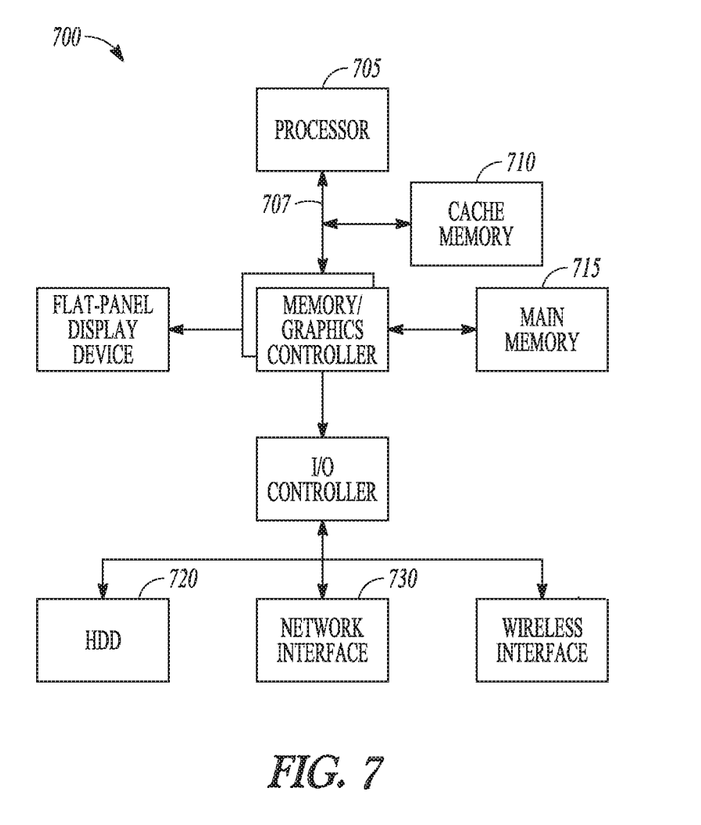
FIG. 7 illustrates a shared-bus computer system in accordance with some embodiments.

FIG. 7, for example, illustrates a shared-bus computer system 700 in accordance with an exemplary embodiment. A processor 705 accesses data from a level one (L1) cache memory 710 and memory 715. In other embodiments of the invention, the cache memory may be a level two (L2) cache or other memory within a computer system memory hierarchy. Furthermore, in some embodiments, the computer system of FIG. 7 may contain both a L1 cache and an L2 cache.

The processor may have any number of processing cores. Other embodiments of the invention, however, may be implemented within other devices within the system, such as a separate bus agent, or distributed throughout the system in hardware, software, or some combination thereof.

Memory 715 can be implemented in various memory sources, such as dynamic random-access memory (DRAM), a hard disk drive (HDD) 720, or a memory source located remotely from the computer system using, at least in part, network interface 730 containing various storage devices and technologies. The cache memory may be located either within the processor or in close proximity to the processor, such as on shared bus 707.

Figure 8:
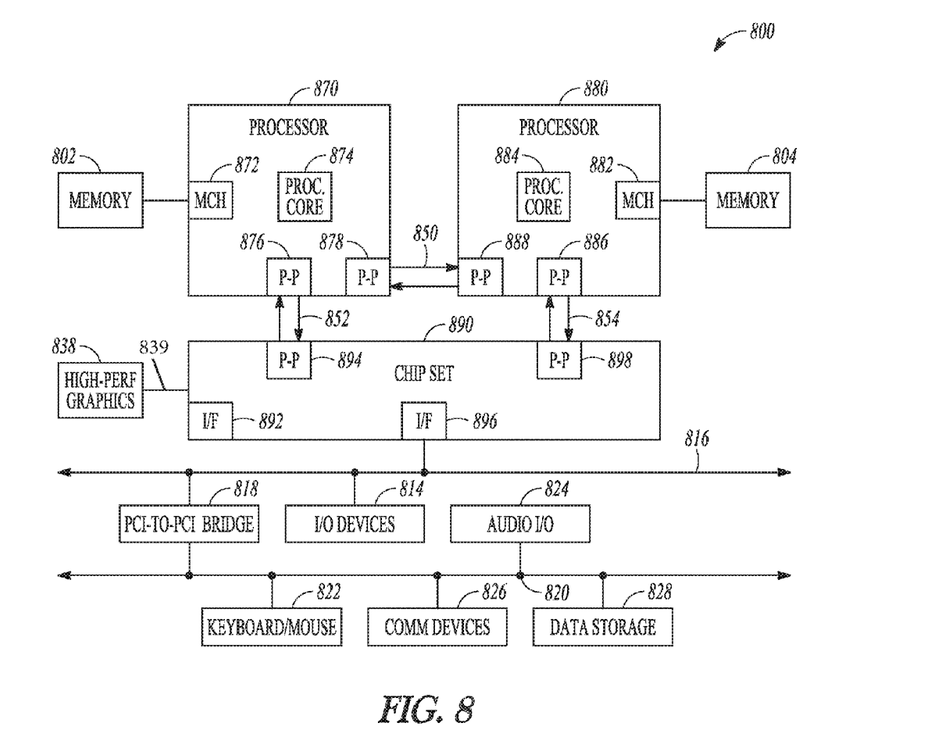
FIG. 8 illustrates a point-to-point (P2P) computer system in accordance with some embodiments.

FIG. 8 illustrates a computer system 800 that is arranged in a point-to-point (P2P) configuration. The system of FIG. 8 may also include several processors, of which only two, processors 870, 880 are shown for clarity. Processors 870, 880 may each include a local memory controller hub (MCH) 872, 882 to connect with memory 802, 804. Processors 870, 880 may exchange data using, at least in part, a P2P interface 850 using P2P interface circuits 878, 888. Processors 870, 880 may each exchange data with a chipset 890 using, at least in part, individual P2P interfaces 852, 854 using P2P interface circuits 876, 886, 894, and 898. Chipset 890 may also exchange data with a high-performance graphics circuit 838 using, at least in part, a high-performance graphics interface 839 using P2P interface circuit 892. Chipset 890 can further be coupled using P2P interface circuit 896 to an I/O bus 816 such as PCI to interface with I/O devices 814 and PCI-to-PCI bridge 818. Additional I/O devices, such as keyboard/mouse 822, comm devices 826, audio I/O 824 and data storage 828 can be coupled to system 800 using, at least in part, PCI-to-PCI bridge 818 coupled to a bus 820. Other embodiments of the invention, however, may exist in other groups of circuits, logic units, or devices within the system of FIG. 8.

Although specific embodiments have been illustrated and described herein, it will be appreciated by those of ordinary skill in the art that embodiments described herein can be used for Complicated Instruction Set Computing (CISC), and non-CISC processors (e.g., Very Long Instruction Word (VLIW) and Reduced Instruction Set Computing (RISC)). In other words, embodiments described herein can be architecture-independent, and can be used to abstract the hardware of many different architectures. For example, Intel Architecture has been mentioned, but other non-Intel architectures can use embodiments. This application is intended to cover any adaptations or variations of embodiments of the present invention. It is to be understood that the above description is intended to be illustrative, and not restrictive, and that the phraseology or terminology employed herein is for the purpose of description and not of limitation. Combinations of the above embodiments and other embodiments will be apparent to those of skill in the art upon studying the above description.

The Abstract is provided to comply with 37 C.F.R. §1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

We claim:

1. A method comprising:
   detecting an event at a processor;
   preserving a state of the processor at the time that the event is detected;
   establishing a new execution state for performing an operation for a first hardware abstraction layer (HAL) that is between a second HAL and the processor, wherein the second HAL is a processor abstraction layer;
   initiating, using, at least in part, the first HAL, and responsive to detecting the event, execution of a hardware abstraction flow; and
   stopping, using, at least in part, the processor, execution of the hardware abstraction flow.

2. The method according to claim 1 further comprising, restoring the preserved processor state after stopping execution of the hardware abstraction flow.

3. The method according to claim 1, wherein establishing the new execution state comprises programming processor registers and branching to a location in a memory to perform the operation.

4. The method according to claim 1, wherein establishing the new execution state comprises performing an operation using, at least in part, a finite state machine.

5. The method according to claim 1, wherein establishing the new execution state further comprises flushing a processor pipeline.

6. A system comprising:
   a memory;
   a memory controller coupled to the memory; and
   a processor, coupled to the memory controller, comprising:
      a cache to perform operations associated with a technology abstraction layer (TAL), wherein events are to trigger a TAL operation and each TAL operation corresponds to a privilege level that can vary.

7. The system of claim 6, further comprising hardware dedicated to the TAL.

8. The system of claim 7, wherein the hardware comprises one or more of the following TAL-dedicated resources: one or more registers, cache entries, translation lookaside buffer, queues, or pipelines.

9. The system of claim 8, wherein the registers dedicated to the TAL are adapted to preserve a state of the processor.

10. The system of claim 6, wherein the TAL operation can change privilege one or more times.

11. The system of claim 6, wherein entries of the cache are to include state information, and the state information comprises a TAL state.

12. The system of claim 6, wherein the memory comprises TAL-specific memory ranges that are only accessible by TAL operations.

13. A processor comprising:
   a configuration register, of a technology abstraction layer (TAL), to store configuration information to abstract privileged processor resources, wherein the configuration information includes information to perform a TAL operation, wherein the TAL operation corresponds to one or more respective TAL events;
   wherein the TAL events include one or more of the following: reset events, error events, interrupt events, operation match events, interrupt address transfer events, and performance events.

14. The processor of claim 13, wherein the TAL is adapted to translate instructions from a first instruction set architecture to a second instruction set architecture.

15. The processor of claim 13, further comprising a cache comprising cache entries including state information, and the state information comprising a TAL state.

16. The processor of claim 15, wherein cache entries in the TAL state are not visible to layers other than the TAL.

17. The processor of claim 13, wherein an address is to point to an operation to substitute an uncorrectable error for a correctable error.

18. The processor of claim 13, wherein the configuration registers are only accessible after entry to the TAL.

* * * * *